US008997024B2

(12) United States Patent
Kent et al.

(10) Patent No.: US 8,997,024 B2
(45) Date of Patent: Mar. 31, 2015

(54) NAVIGATING BETWEEN VIEWS OF A GRAPH USING PLACEMARKERS

(75) Inventors: Stuart John Harding Kent, Canterbury (GB); Blair Stuart McGlashan, Biggleswade (GB); Jens Kåre Jacobsen, Seattle, WA (US); Tyler Edward Gibson, Seattle, WA (US); Andrew Jude Byrne, Redmond, WA (US); Sadi Sufi Khan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 12/963,634

(22) Filed: Dec. 9, 2010

(65) Prior Publication Data

US 2012/0151419 A1 Jun. 14, 2012

(51) Int. Cl.
*G06F 3/048* (2013.01)
*G06F 9/44* (2006.01)

(52) U.S. Cl.
CPC ........................ *G06F 8/75* (2013.01)
USPC .......................................... 715/854; 715/853

(58) Field of Classification Search
CPC .................... G06F 17/30958; G06F 17/30961; G06F 3/0481; G06F 3/0482
USPC ................................................. 715/848–854
See application file for complete search history.

(56) References Cited

U.S. PATENT DOCUMENTS

| | | | |
|---|---|---|---|
| 6,496,208 B1 * | 12/2002 | Bernhardt et al. ............ 715/853 |
| 6,724,875 B1 * | 4/2004 | Adams et al. ............ 379/201.01 |
| 7,000,199 B2 * | 2/2006 | Steele et al. .................. 715/854 |
| 7,174,536 B1 | 2/2007 | Kothari et al. |
| 7,409,679 B2 * | 8/2008 | Chedgey et al. ............. 717/144 |
| 7,631,290 B1 | 12/2009 | Reid et al. |
| 7,644,390 B2 | 1/2010 | Khodabandehloo et al. |
| 7,680,889 B2 * | 3/2010 | Blumenau et al. ........... 709/206 |
| 8,209,657 B1 * | 6/2012 | Sawyer et al. ............... 717/100 |
| 2004/0054985 A1 | 3/2004 | Sewell |
| 2006/0150169 A1 * | 7/2006 | Cook et al. .................... 717/156 |
| 2008/0316213 A1 * | 12/2008 | Eagen et al. .................. 345/474 |
| 2009/0112465 A1 * | 4/2009 | Weiss et al. ................... 701/211 |
| 2009/0150130 A1 | 6/2009 | Ludwig |
| 2009/0204582 A1 * | 8/2009 | Grandhi et al. .................... 707/3 |
| 2010/0079462 A1 * | 4/2010 | Breeds et al. ................. 345/440 |
| 2010/0083172 A1 * | 4/2010 | Breeds et al. ................. 715/810 |
| 2010/0194744 A1 | 8/2010 | Glueck et al. |

OTHER PUBLICATIONS

"Editing JPEG photos, thumbnails and your privacy—edited out bits may still be visible", Jun. 8, 2007, consumingexperience.com, pp. 1-4.*

(Continued)

*Primary Examiner* — Kieu Vu
*Assistant Examiner* — Asteway T Gattew
(74) *Attorney, Agent, or Firm* — Jim Banowsky; Kate Drakos; Micky Minhas

(57) ABSTRACT

A method includes transmitting an interface to a display device, where the interface represents a view of at least a portion of a graph. The graph is based on a model of a system and includes a plurality of nodes connected by a plurality of links, where at least one node of the graph includes another node. The method includes receiving a command to store a placemarker corresponding to the view and storing the placemarker. The placemarker is selectable to restore the view at the interface.

18 Claims, 10 Drawing Sheets

(56) References Cited

OTHER PUBLICATIONS

Lorelle VanFossen, "Web Browser Guide: Favorites, Bookmarks, and History", May 24, 2007, blogherald.com, pp. 1-10.*
Dennis O'Reilly, "Customize the history settings in Firefox and Internet Explorer", May 29, 2008, cnet.com, pp. 1-6.*
"Schedule and Automate your Screen Recorder," Aug. 24, 2010, deskshare.com, pp. 1-2.*
Al-Enezi, Mamdouh., "Software Visualization for Software Development", Retrieved at <<http://www.abufaisal9.com/Files/SV-for-SD.pdf>>, May 2009, pp. 11.
Bederson, et al., "Toolkit Design for Interactive Structured Graphics", Retrieved at <<http://ieeexplore.ieee.org/stamp/stamp.jsp?tp=&arnumber=1316870 >>, IEEE Transactions on Software Engineering, vol. 30, No. 8, Aug. 2004, Downloaded on Aug. 12, 2010, pp. 535-546.
Voinea, Stefan-Lucian., "Software Evolution Visualization", Retrieved at <<http://alexandria.tue.nl/extra2/200711345.pdf>>, 2007, pp. 181.
Siegler, Mg., "Firefox Just Perfected Tabbed Browsing. It's Like Apple's Expose Plus Spaces For The Web", Retrieved at <<http://techcrunch.com/2010/07/23/firefox-tab-candy/>>, Jul. 23, 2010, pp. 3.

* cited by examiner

NAVIGATING BETWEEN VIEWS OF A GRAPH USING PLACEMARKERS

BACKGROUND

Pictorial representations may be used to illustrate and explain complex systems. For example, software developers may "sketch out" a picture of an application before and during the development of the application. However, as software applications become larger and more complex, it may become more challenging to visualize and manage the structure of the software applications. For example, current visualization tools may divide an application into a tree-like structure of elements. It may not be possible to view software entities from different elements at the same time, even when the software entities are closely related. Moreover, viewing different elements of the tree-like structure may involve confusing and time-consuming context switches between the different elements.

SUMMARY

Systems and methods of navigating between views of a graph using placemarkers are disclosed. For example, the graph may represent a software system. To illustrate, the techniques disclosed herein may enable fast and easy transitions between "high-level" views of an entire software system and "drill-down" views of specific components and workflows. A data model of the software system may be converted into a graph, and an interface may be provided to view and manipulate the graph. A user may save placemarkers to particular high-level and drill-down views (e.g., high-level or drill-down views that the user frequently uses to understand the software system). After the user has navigated away from a view corresponding to a saved placemarker, the user may select the saved placemarker to restore the view. Thus, the placemarker may represent a "snapshot" of a region of the graph. The interface may also maintain a history of past views and enable a user to save a list of "favorite" placemarkers. It should be noted that although the described embodiments refer to a software system, the disclosed techniques may be used with any type of nested graph (e.g., graphs in which nodes may contain other nodes).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a method includes transmitting an interface to a display device. The interface represents a view of at least a portion of a graph illustrating a system. The graph includes a plurality of nodes connected by a plurality of links, and at least one node of the graph includes another node (e.g., a sub-node). The method also includes receiving a command to store a placemarker corresponding to the view. The method further includes storing the placemarker. The placemarker is selectable to restore the view at the interface.

In another particular embodiment, a non-transitory computer-readable storage medium includes instructions that, when executed by a computer, cause the computer to create a nested graph. The nested graph includes a plurality of nodes connected by a plurality of links, and at least one node of the nested graph includes another node. The instructions are further executable to transmit an interface to a display device, where the interface represents a view of at least a portion of the nested graph. The instructions are executable to receive a command to store a placemarker corresponding to the view. The placemarker is selectable to restore the view at the interface. The interface includes a history region that identifies stored placemarkers and that is operable to navigate between the stored placemarkers.

In another particular embodiment, a computer system includes a processor and a mapping module executable by the processor to create a graph representative of a system. The graph includes a plurality of nodes connected by a plurality of links, and at least one node of the graph includes another node. The system also includes a rendering module configured to generate an interface that represents a view of at least a portion of the graph. The system further includes a graph control module executable by the processor to receive a command to store a placemarker corresponding to the view. The placemarker is selectable to restore the view at the interface. The graph control module is also executable by the processor to receive a command to select the placemarker and to transmit the placemarker to the rendering module for modification of the interface to restore the view corresponding to the placemarker.

Figure 1:
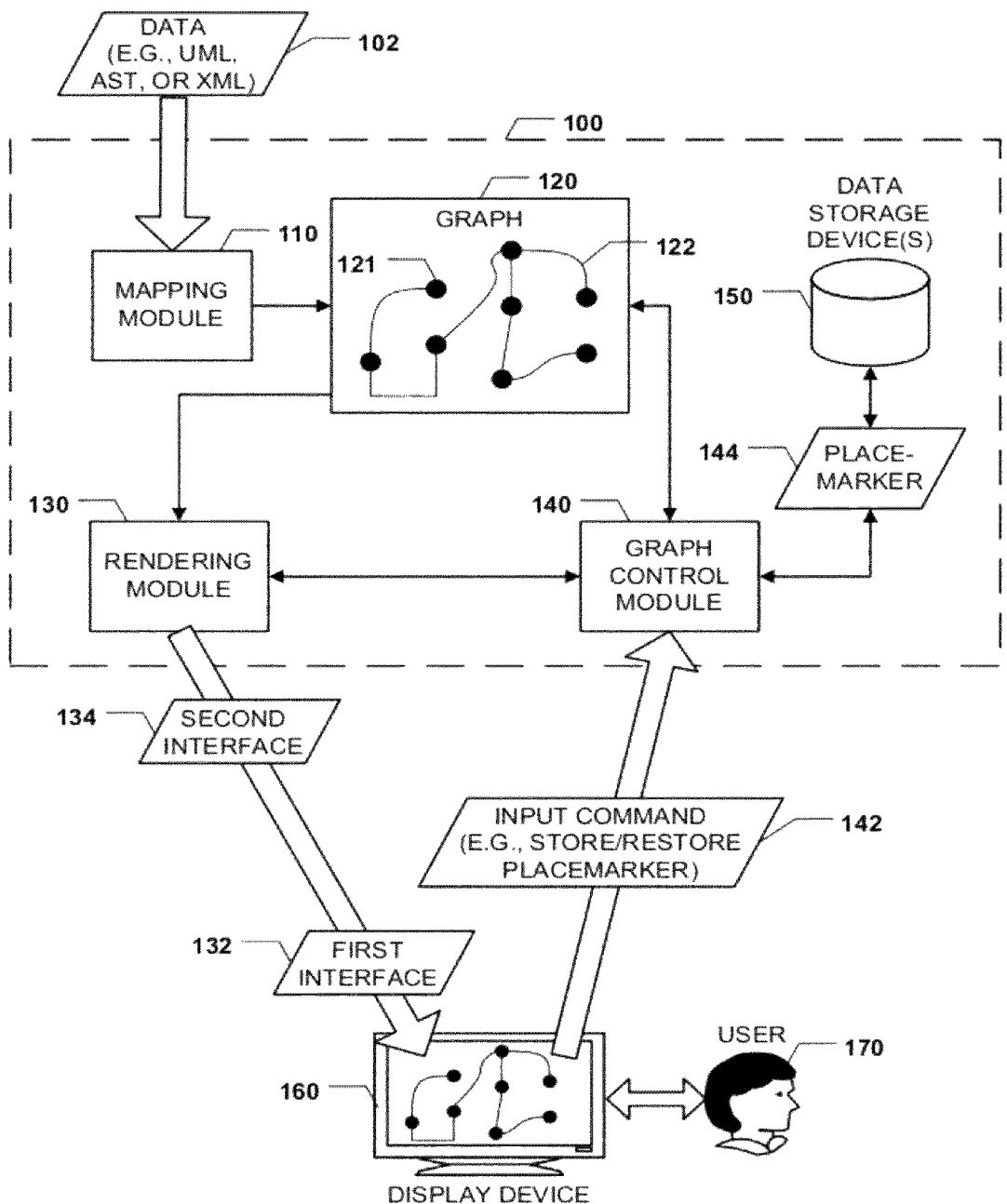
FIG. 1 is a diagram to illustrate a particular embodiment of a system of navigating between views of a graph using placemarkers.

FIG. 1 is a diagram to illustrate a particular embodiment of a system 100 of navigating between views of a graph 120 (e.g., a graph viewing a software system) using one or more placemarkers (e.g., an illustrative placemarker 144). The system includes a mapping module 110, a rendering module 130, and a graph control module 140. The system 100 may also include one or more data storage devices 150.

The mapping module 110 may receive data 102 to be visualized (e.g., a model of a software system). For example, the data 102 may include data stored in files, memories, or databases. To illustrate, with respect to software systems, the data 102 may include one or more unified modeling language (UML) files, one or more abstract syntax trees (ASTs), one or more extensible markup language (XML) configuration files, other files representing the structure and function of a software application or system, or any combination thereof. In a particular embodiment, all or a portion of the data 102 is automatically generated by an integrated development environment (IDE) that is used to develop and test the software system.

The mapping module 110 may be configured to generate a graph (e.g., the graph 120) based on the data 102. For example, the graph 120 may provide a visual representation of the structure and functions of the software application or system represented by the data 102. In a particular embodiment, the graph 120 includes a plurality of nodes connected by a plurality of links. Each node 121 of the graph 120 may represent a particular component of the software system. For example, software system components may include classes, data structures, objects, functions, input interfaces, output interfaces, database tables, other components, or any combination thereof. Each link 122 of the graph 120 that connects a pair of nodes may represent a relationship between the components that correspond to the pair of nodes. For example, nodes corresponding to a pair of classes "Color" and "Red" may be connected by a link representing an inheritance relationship (e.g., indicating that the class "Red" inherits from the class "Color"). In an alternate embodiment, the graph 120 may be generated from application data and source code files without use of a software system model. In another particular embodiment, the graph 120 may be used to generate a model of the software system.

In a particular embodiment, the graph 120 includes a plurality of sub-diagrams. For example, a software system may be represented by multiple class diagrams, execution sequence diagrams, use case diagrams, and activity diagrams. The graph 120 may include cross-links between nodes of different sub-diagrams. Moreover, certain nodes may be duplicated across different sub-diagrams. For example, a node representing a particular class may appear in a class diagram as well as an execution sequence diagram that involves objects of the particular class. Each sub-diagram may also include different visual settings. For example, some sub-diagrams may include straight-line edges while other sub-diagrams may include rectilinear or spline-routed edges. As another example, some sub-diagrams may include non-overlapping shapes while other diagrams may not accept non-overlapping shapes. The graph 120 may therefore be used to simultaneously view sub-diagrams having different visual settings.

The rendering module 130 may be configured to generate an interface that represents a view of the graph 120. For example, the view may include all or a portion of the graph 120 (i.e., each node and link of the graph 120 or a subset of the nodes and links of the graph 120). To illustrate, the rendering module 130 may generate a first interface 132 and transmit the first interface 132 to a display device 160 (e.g., a monitor or other display device coupled to the system 100).

The system 100 may also include a graph control module 140. In a particular embodiment, the graph control module 140 may enable a user (e.g., an illustrative user 170) to interact with the graph 120 via interfaces rendered by the rendering module 130. For example, the graph control module 140 may be configured to manipulate placemarkers associated with the graph 120. Placemarkers may provide a "snapshot" mechanism to save particular views of the graph 120 for future reference. For example, the graph control module 140 may receive an input command 142 to store the placemarker 144 corresponding to the view represented by the first interface 132. The graph control module 140 may store the placemarker 144 at the one or more data storage devices 150. When the graph control module 140 receives a subsequent command 142 that represents a selection of the placemarker 144, the graph control module 140 may retrieve and transmit the placemarker 144 to the rendering module 130. The rendering module 130 may render a second interface 134 that restores the view corresponding to the placemarker 144. Placemarkers are further described and illustrated with reference to FIGS. 7-8.

In a particular embodiment, the graph control module 140 may enable the user 170 to modify the graph 120 by modifying the interface 132. For example, the user 170 may rearrange nodes via the first interface 132. The graph control module 140 may detect such changes and modify the graph 120 accordingly. The rendering module 130 may also update the first interface 132 based on the modification. To illustrate, the user 170 may place a first node inside a second node at the first interface 132. In response, the graph control module 140 may modify the graph 120. For example, the underlying software components corresponding to the nodes may be refactored and the data 120 may be modified based on the refactoring. In addition, the rendering module 130 may update the first interface 132 to reflect the refactoring.

In a particular embodiment, placemarkers store a plurality of data items that are characteristic of a view of the graph 120 and that are useable to restore the view of the graph 120. For example, the placemarker 144 may identify the bounds of a region of the graph 120 that is included in the view. Alternately, or in addition, the placemarker 144 may identify the nodes of the graph 120 that are included in the view (e.g., visible in the first interface 132). The placemarker 144 may thus represent an area of the graph 120 and not merely a single point on the graph 120.

The placemarker 144 may indicate whether each node in the view is selected or unselected, a zoom level of the view, which particular node is closest to a center of the view, or any combination thereof. In a particular embodiment, the interfaces 132-134 may enable editing of stored placemarkers. For example, the user 170 may rename the placemarker 144, modify which nodes are included in the view represented by the placemarker 144, and specify conflict resolution options for the placemarker 144. Placemarker options are further described with reference to FIG. 8.

In a particular embodiment, the command 142 to store the placemarker 144 is received via user input, as depicted in FIG. 1. Alternately, a command to store a placemarker may automatically be generated and received by the graph control module 140. For example, the command may be received in response to detecting certain actions (e.g., actions by the user 170) at the interface displayed at the display device 160. For example, storage of placemarkers may be automatically triggered by expanding or collapsing a node or a group of nodes, zooming in or zooming out at the interface, performing a search of the graph 120, traversing a link of the graph (e.g., from a first node to a second node), or any combination thereof. In a particular embodiment, the list of actions that trigger automatic storage of placemarkers is configurable by the user 170. Automatically storing placemarkers based on user actions may enable the system 100 to implement a navigation history, as further described and illustrated with reference to FIG. 7.

In a particular embodiment, the system 100 may automatically update the graph 120 and the interfaces 132, 134 in response to changes in the data 102 or in the underlying software system. For example, the mapping module 110 may detect a change in the model of the software system and may modify the graph 120 accordingly. The rendering module 130 may update the first interface 132 displayed at the display device 160 to reflect the change in the model, and the graph control module 140 may update the stored placemarker 144 to reflect the change in the model.

In operation, the mapping module 110 may create the graph 120 based on the data 102. The rendering module 130 may generate the first interface 132, where the first interface 132 represents a view of at least a portion of the graph 120. The rendering module 130 may transmit the first interface 132 to the display device 160. The user 170 may then interact with the first interface 132 via the display device 160 and/or an input device (not shown), such as a touchscreen of the display device 160, a keyboard, or a mouse.

For example, the user 170 may enter the input command 142 to store the placemarker 144, where the placemarker 144 is selectable to restore the view represented by the interface 132. Alternately, a command to store the placemarker 144 may be generated automatically based on actions performed by the user 170. The graph control module 140 may store the placemarker 144 at the one or more data storage devices 150. When the user 170 desires to restore the view, the user 170 may select the placemarker 144 (e.g., represented by an icon or thumbnail displayed by the display device 160), which causes the graph control module 140 to retrieve the placemarker 144 and to transmit the placemarker 144 to the rendering module 130 for rendering of the second interface 134. The placemarker 144 may thus be considered a visual thumbnail representing the state of the graph 120 when the placemarker 144 was created. The second interface 134 may be transmitted to the display device 160, thereby restoring the view. It should be noted that although the second interface 134 as illustrated as being distinct from the first interface 132, a view may also be restored by modifying an existing interface. Generally, the process of restoring a view may be performed in a smooth fashion and without sudden changes at the display device 160.

It will be appreciated that the system 100 of FIG. 1 may enable navigation of the graph 120 via the use of placemarkers, such as the illustrative placemarker 144. The user 170 may thus quickly and easily transition between a placemarker associated with a high-level view of the entire graph 120 and placemarkers associated with drill-down views of particular class diagrams, execution sequences, use cases, and activities.

FIGS. 2-8 depict various embodiments of interfaces, graphs, and sub-diagrams associated with an illustrative software system that is used at a car rental company. However, it should be noted that the car rental scenario is for example only. The techniques disclosed herein may be used in conjunction with any software application, system, or workflow. Moreover, the techniques disclosed herein may also be used in conjunction with graphs (e.g., nested graphs) representative of systems other than software systems.

Figure 2:
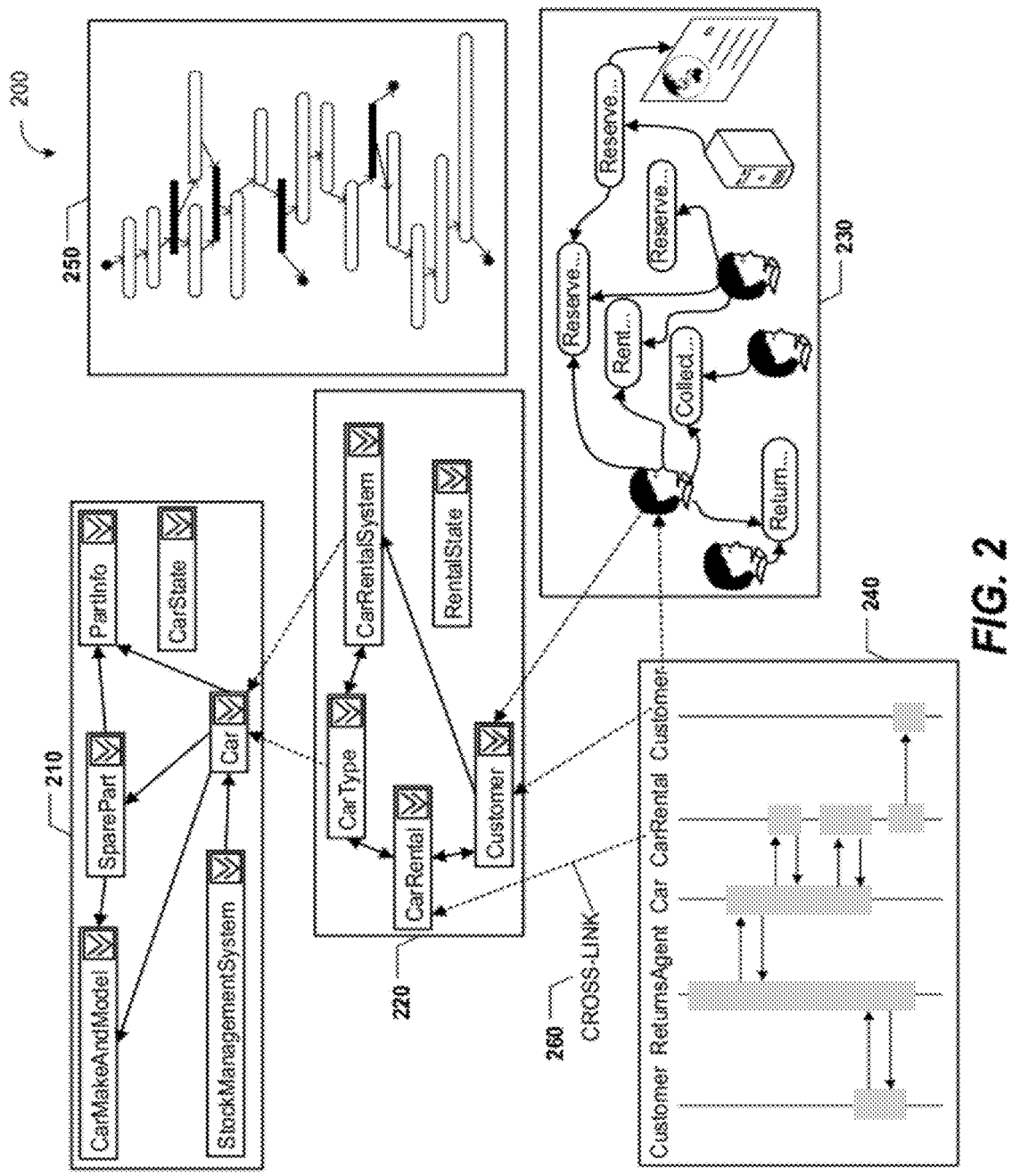
FIG. 2 is a diagram to illustrate a particular embodiment of the graph of FIG. 1.

FIG. 2 is a diagram to illustrate a particular embodiment of a graph 200 that is based on a model of a software system. For example, the graph 200 may be the graph 120 of FIG. 1.

In the particular embodiment illustrated in FIG. 2, the graph 200 includes five sub-diagrams 210-250. A first sub-diagram 210 and a second sub diagram 220 may each represent class diagrams. A third sub-diagram 230 may represent a use case of the car rental software system. A fourth sub-diagram 240 may represent an execution sequence of the car rental software system, and a fifth sub-diagram 250 may represent an activity of the car rental software system. The graph 200 may also include cross-links between sub-diagrams. For example, a cross-link 260 may connect the second sub-diagram 220 and the fourth sub-diagram 240, since both sub-diagrams include a node corresponding to a "CarRental" class. It will thus be appreciated the graph 200 of FIG. 2 may present a high-level view of a software system, including presenting information from multiple sub-diagrams. Moreover, the graph 200 of FIG. 2 may depict relationships not easily identifiable when context-switching between distinct sub-diagrams, such as the relationship associated with the cross-link 260. Each of the sub-diagrams 210-250 may be considered nodes of a nested graph that include sub-nodes, as further described herein with reference to FIGS. 3-6.

Figure 3:
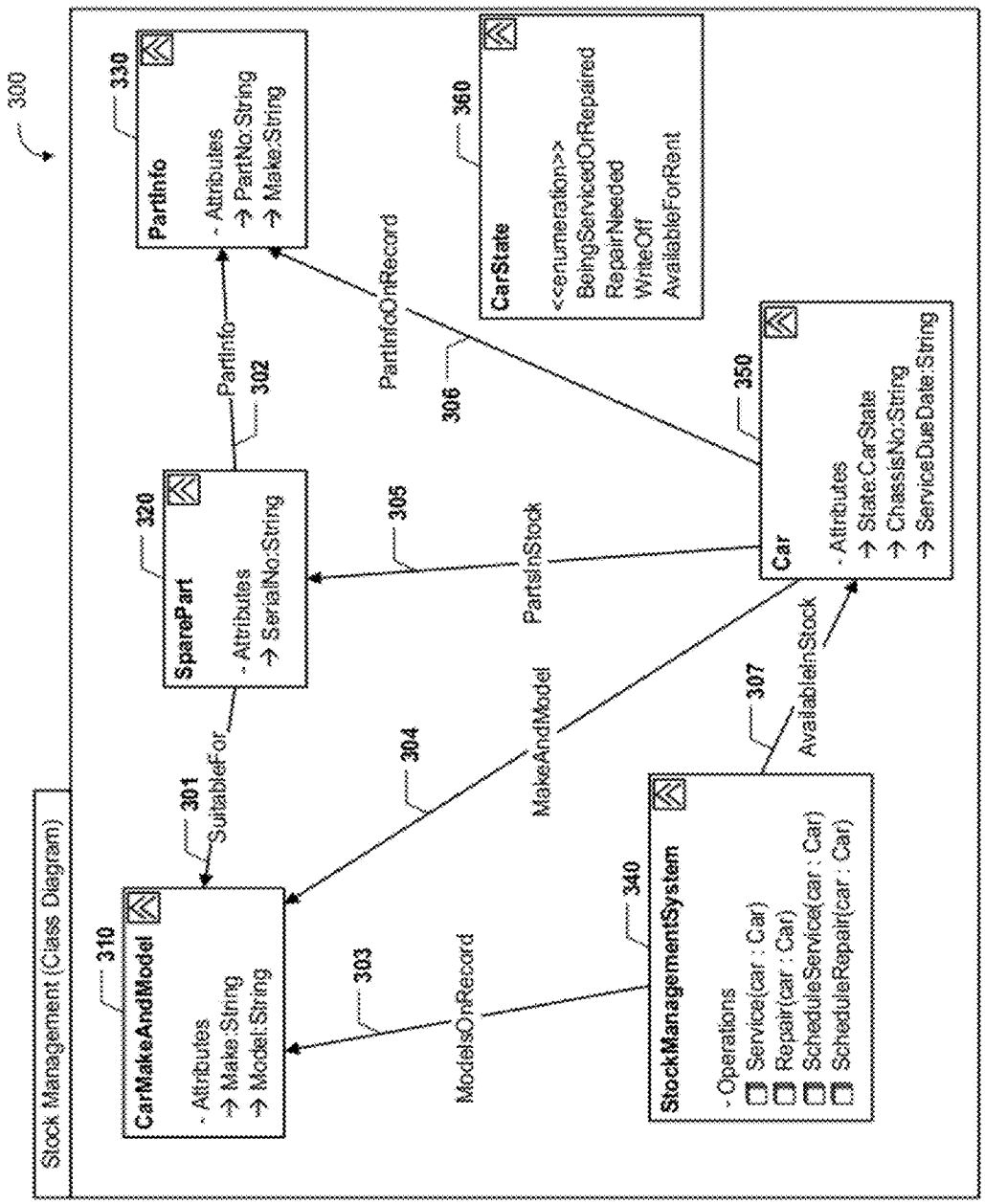
FIG. 3 is a diagram to illustrate a particular embodiment of a class diagram included in the graph of FIG. 2.

FIG. 3 is a diagram to illustrate a particular embodiment of a class diagram 300. For example, the class diagram 300 may be the sub-diagram 210 of FIG. 2. In the particular embodiment illustrated, the class diagram 300 represents a stock management class diagram.

The car rental software system may include various classes that are used to track and manage inventory at the car rental company. For example, a "CarMakeandModel" class (corresponding to a node 310) may include "Make" and "Model" elements and may be used to define objects that represent the various models in inventory. A "SparePart" class (corresponding to a node 320) may include a "SerialNo" element, and a "PartInfo" class (corresponding to a node 330) may include "PartNo" and "Make" elements. Each individual car in the inventory may be associated with a "Car" class (corresponding to a node 350), which includes "State," "ChassisNo," and "ServiceDueDate" elements.

Furthermore, as illustrated in FIG. 3, the "State" data element may be of an enumerated data type "CarState" (corresponding to a node 360), which has the possible values "BeingServicedorRepaired," "RepairNeeded," "WriteOff," and "AvailableForRent." A "StockManagementSystem" class (corresponding to a node 340) may include functions or methods such as "Service," "Repair," "ScheduleService," and "ScheduleRepair." In addition, as illustrated in FIG. 3, the classes may be related via relationships such as "SuitableFor" (corresponding to a link 301), "PartInfo" (corresponding to a link 302), "ModelsOnRecord" (corresponding to a link 303) "MakeAndModel" (corresponding to a link 304) "PartsInStock" (corresponding to a link 305), "PartsInfoOnRecord" (corresponding to a link 306), and "AvailableInStock" (corresponding to a link 307).

Figure 4:
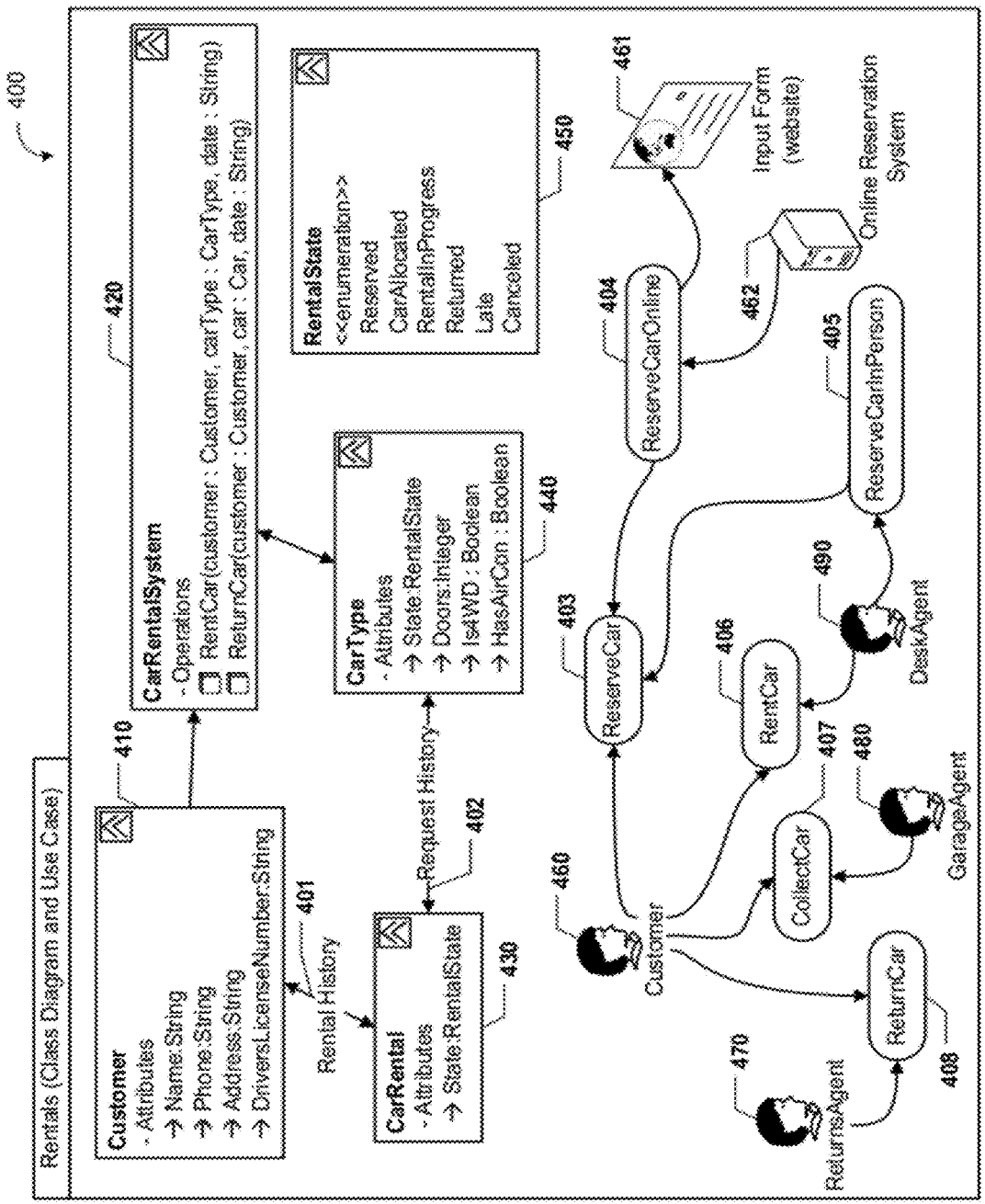
FIG. 4 is a diagram to illustrate another particular embodiment of the class diagram included in the graph of FIG. 2 and to further illustrate a particular embodiment of a use case included in the graph of FIG. 2.

FIG. 4 illustrates a particular embodiment of combined sub-diagram 400. For example, the top portion of the combined sub-diagram 400 may include the sub-diagram 220 of FIG. 2 (i.e., a class diagram) and the bottom half of the combined sub-diagram may include the sub-diagram 230 of FIG. 3 (i.e., a use case).

The car rental software system may include various classes that are used to track and manage the car rental process. For example, a "Customer" class (corresponding to a node 410) may include "Name," "Phone," "Address," and "DriversLicenseNumber" elements. A "CarRentalSystem" class (corresponding to a node 420) may include methods or functions such as "RentCar," and "ReturnCar." A "CarType" class (corresponding to a node 440) may include "Doors," "Is4WD," and "HasAirCon" elements. Both the "CarType" class and a "CarRental" class (corresponding to a node 430) may also include a "State" element of an enumerated data type "RentalState" (corresponding to a node 450), which has the possible values "Reserved," "CarAllocated," "RentalInProgress," "Returned," "Late," and "Canceled." The classes may be related via relationships such as "Rental History" (depicted by a link 401 between the nodes 410 and 430) and "Request History" (depicted by a link 402 between the nodes 430 and 440).

The car rental software system may also include a work flow representing a car rental use case, as depicted in the bottom half of FIG. 4. For example, the car rental use case may involve one or more of a customer (corresponding to a node 460), a returns agent (corresponding to a node 470), a garage agent (corresponding to a node 480), and a desk agent (corresponding to a node 490). To illustrate, the customer of the car rental company may reserve a car (corresponding to a "ReserveCar" node 403) either in person (corresponding to a "ReserveCarInPerson" node 404) via the desk agent or online (corresponding to a "ReserveCarOnline" node 405) via an input form (corresponding to a node 461) at a website. Online reservations may also involve an online reservation system (corresponding to a node 462). Alternately, instead of reserving a car, the customer may directly rent a car (corresponding to a node "RentCar" 406) from the desk agent. The customer may then collect the rented car (corresponding to a "Collect-Car" node 407) from the garage agent. The customer may terminate the rental by returning the car (corresponding to a "ReturnCar" node 408) to the returns agent.

Figure 5:
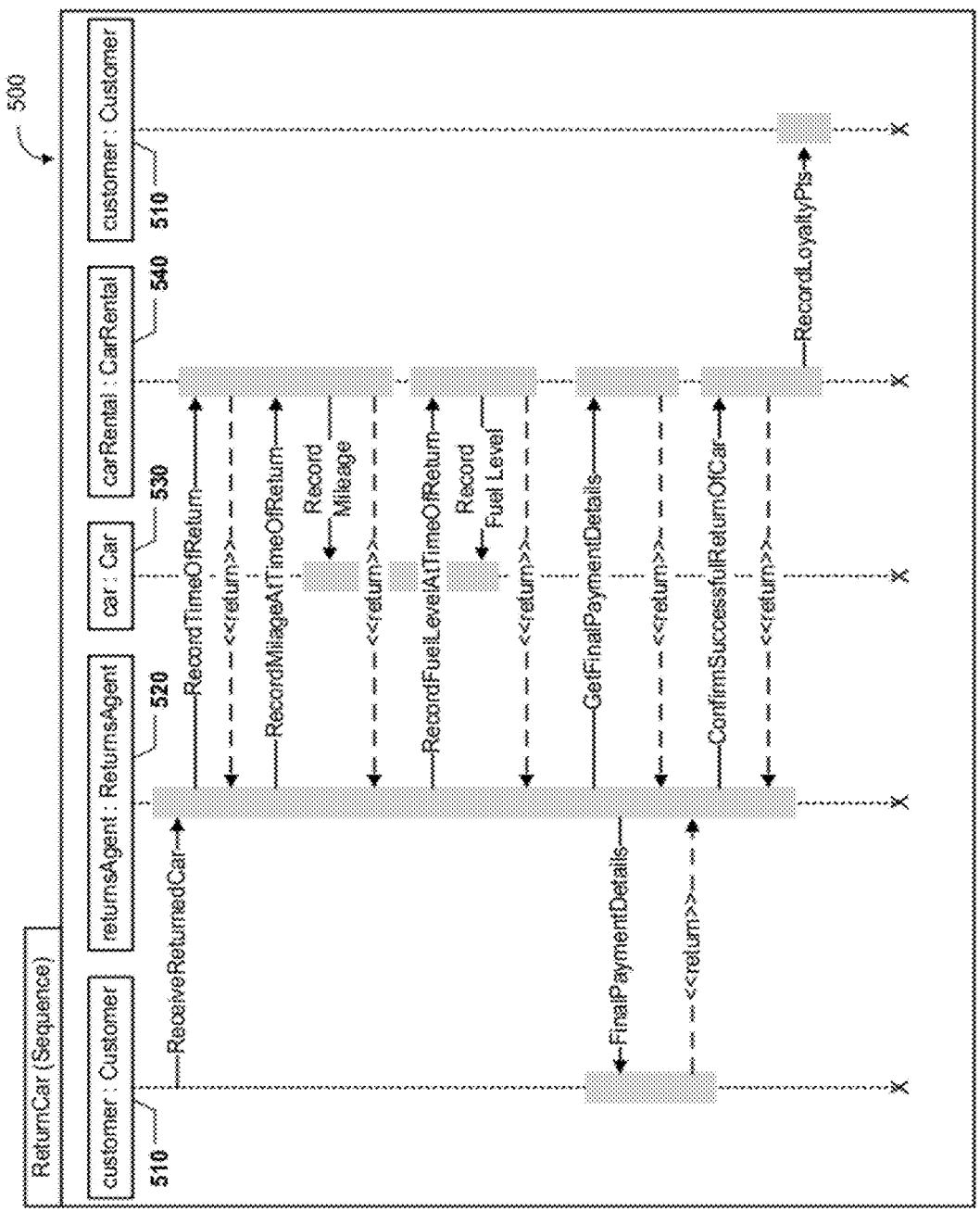
FIG. 5 is a diagram to illustrate a particular embodiment of an execution sequence included in the graph of FIG. 2.

FIG. 5 is a diagram to illustrate a particular embodiment of an execution sequence 500. For example, the execution sequence 500 may be the sub-diagram 240 of FIG. 2. In an illustrative embodiment, the execution sequence 500 corresponds to the "ReturnCar" node 408 of FIG. 4.

During the execution sequence 500, various operations may be performed at various components of the car rental software system. For example, completing a car return may involve the "Customer" class (corresponding to a node 510), a "ReturnsAgent" class (corresponding to a node 520), the "Car" class (corresponding to a node 530) and the "CarRental" class (corresponding to a node 540). To illustrate, the "ReturnCar" execution sequence 500 may include operations such as receiving the returned car, recording the time of return, recording the mileage and fuel level of the car at the time of return, getting final payment details, confirming successful return of the car, and recording loyalty points for the customer.

Figure 6:
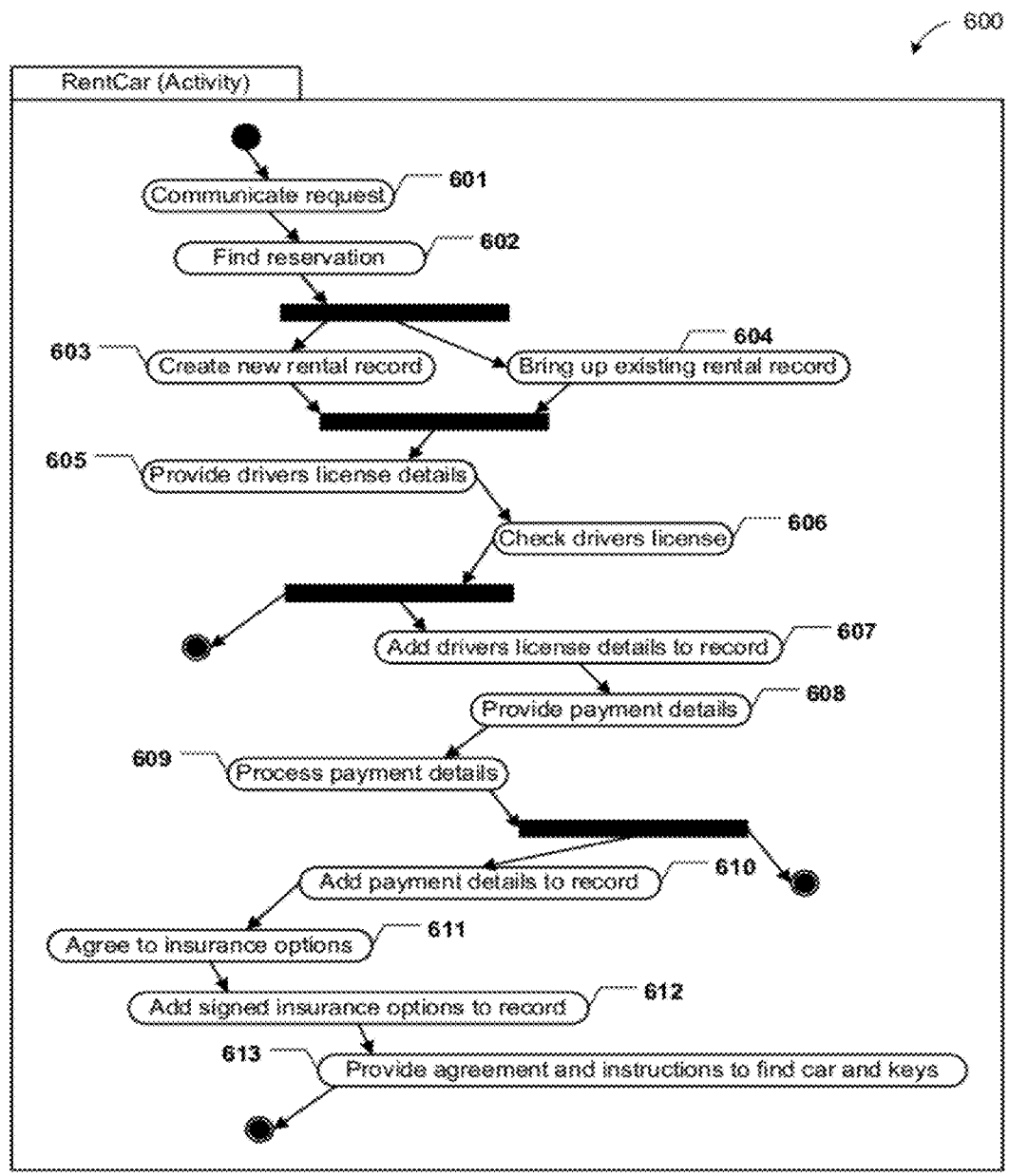
FIG. 6 is a diagram to illustrate a particular embodiment of an activity included in the graph of FIG. 2.

FIG. 6 is a diagram to illustrate a particular embodiment of an activity 600. For example, the activity 600 may be the sub-diagram 250 of FIG. 2. In an illustrative embodiment, the activity 600 corresponds to the "RentCar" node 406 of FIG. 4.

The activity 600 may be represented as a flow diagram describing the various operations involved in renting a car. To illustrate, a request may be communicated, at 601, and a reservation may be verified, at 602. Depending on whether an existing rental record exists, a new rental record may be created, at 603, or the existing rental record may be brought up, at 604. The customer may provide drivers license details, at 605, and the details may be verified, at 606. If the details are successfully verified, the drivers license details may be added to the rental record, at 607. The customer may provide payment details, at 608, and the payment details may be processed, at 609. If the payment details are successfully processed, the payment details may be added to the rental record, at 610. The customer may then agree to insurance options, at 611, and the signed insurance options may be added to the rental record, at 612. The "RentCar" activity may terminate at 613, where the customer is provided the rental agreement and instructions describing how to find the rented car and keys.

Figure 7:
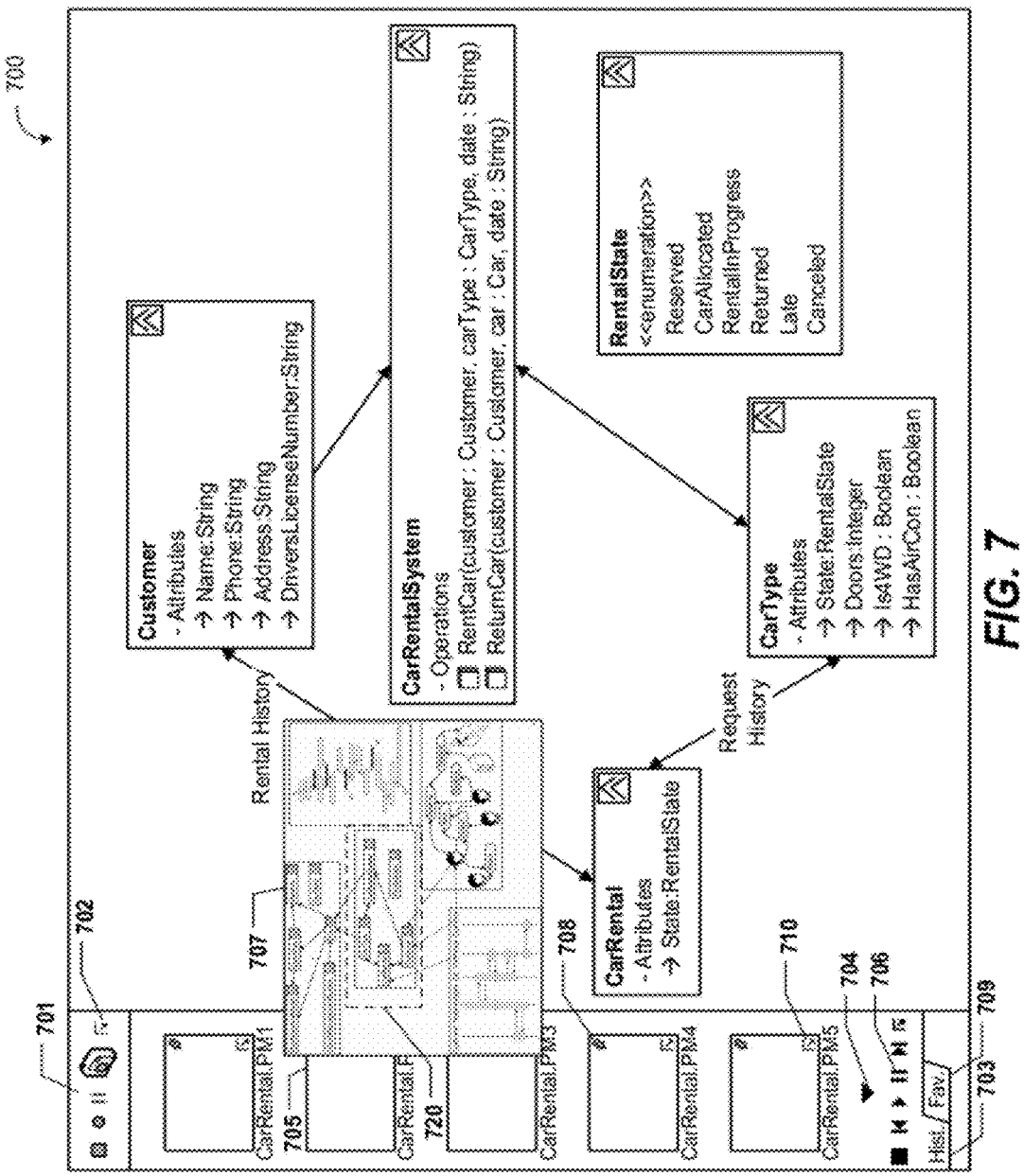
FIG. 7 is a diagram to illustrate a particular embodiment of an interface operable to navigate the graph of FIG. 2 using placemarkers.

FIG. 7 is a diagram to illustrate a particular embodiment of an interface 700 operable to navigate a graph using placemarkers. For example, the interface 700 may be the first interface 132 or the second interface 134 of FIG. 1.

In a particular embodiment, the interface 700 includes a placemarker recording control 701. The placemarker recording control 701 may include stop, record, and pause buttons. The placemarker recording control 701 may also include a camera button. Selection of the camera button may represent a user input command to store a placemarker. In a particular embodiment, the placemarker recording control 701 may enable a user to start recording actions at the interface 700, stop recording actions, and edit the recorded actions to keep one or more actions and discard one or more actions. When repeated, the recorded sequence of actions may cause the interface 700 to display a particular view of the graph, and the corresponding placemarker may be selected at any time to restore the particular view. In an illustrative embodiment, the graph is the graph 120 of FIG. 1 or the graph 200 of FIG. 2, and the placemarker is the placemarker 144 of FIG. 1. For example, as depicted in FIG. 7, the view may correspond to a portion of the graph 200 of FIG. 2 that includes the second sub-diagram 220 of FIG. 2. The placemarker recording control 701 may also include an options button 702 that is selectable to view and modify recording options, as further described with reference to FIG. 8.

In a particular embodiment, the interface 700 includes a history tab 703 corresponding to a history region that identifies stored placemarkers and that is operable to navigate between the stored placemarkers. Each placemarker may be represented at the interface 700 by a thumbnail, such as an illustrative thumbnail 705. When the history tab 703 includes more placemarker thumbnails than can be displayed at the interface 700, the history tab 703 may include a control 704 that is operable to display additional placemarker thumbnails. The history tab 703 may also include placemarker navigation controls 706 such as a step back control, a step forward control, a pause control, and a restart control.

In a particular embodiment, when a user "hovers" over a particular thumbnail 705 (e.g., by pointing a mouse at the thumbnail 705 but not clicking on the thumbnail 705), the interface 700 may identify how the corresponding placemarker fits within a larger context (e.g., the entire software system). For example, as illustrated in FIG. 7, the view represented by the placemarker may be outlined, at 720, within the context of a graph 707 of the entire software system (e.g., a miniaturized version of the graph 200 of FIG. 2). In another particular embodiment, when the graph 707 or the underlying placemarker changes, the thumbnail 705 may be modified (e.g., by a rendering module such as the rendering module 130 of FIG. 1) to reflect the changes.

In a particular embodiment, each placemarker 705 includes a control 708 (illustrated in FIG. 7 as a push-pin) operable to add the placemarker 705 to a favorites tab 709 (e.g., corresponding to a favorites region of the interface 700). For example, the favorites tab 709 may represent an edited navigation history that is saved along with the graph of the software system. Each placemarker may be given an automatically-generated name upon creation. For example, the automatically-generated name may be of the form <SystemName>.PM<number> (e.g., "CarRental.PM1," "CarRental.PM2," etc.). The interface 700 may also include a favorites options control 710, as further described with reference to FIG. 8. The favorites options control 710 may be enabled in the favorites tab 709 but may be disabled or not present in the history tab 703. In a particular embodiment, placemarkers in the favorites tab 709 can be reordered. Moreover, a graph of a software system may be associated with multiple favorites lists (e.g., a list for each user). The interface 700 may also enable deletion, re-ordering, and chaining of placemarkers, thus providing storyboard-style control of the placemarkers.

It will be appreciated that the interface 700 of FIG. 7 may enable users to navigate large graphs of complex software systems quickly and efficiently via the use of placemarkers. The interface 700 of FIG. 7 may also provide a convenient placemarker history and a favorites region. For example, if a particular manager is responsible for a particular portion of a software system, the user may mark a placemarker to a drill-down view of the particular portion as a "favorite." The manager may access the favorite placemarker to track changes made by the manager's employees (e.g., software developers). It will be appreciated that accessing the favorite placemarker may be faster than repeatedly navigating from a high-level view of the software system to the desired drill-down view. Thus, a particular list of favorites may be used to preserve a specific walkthrough of various regions of the graph, such as a walkthrough of the high-level architecture of the software system or the low-level functionality of a specific component.

Figure 8:
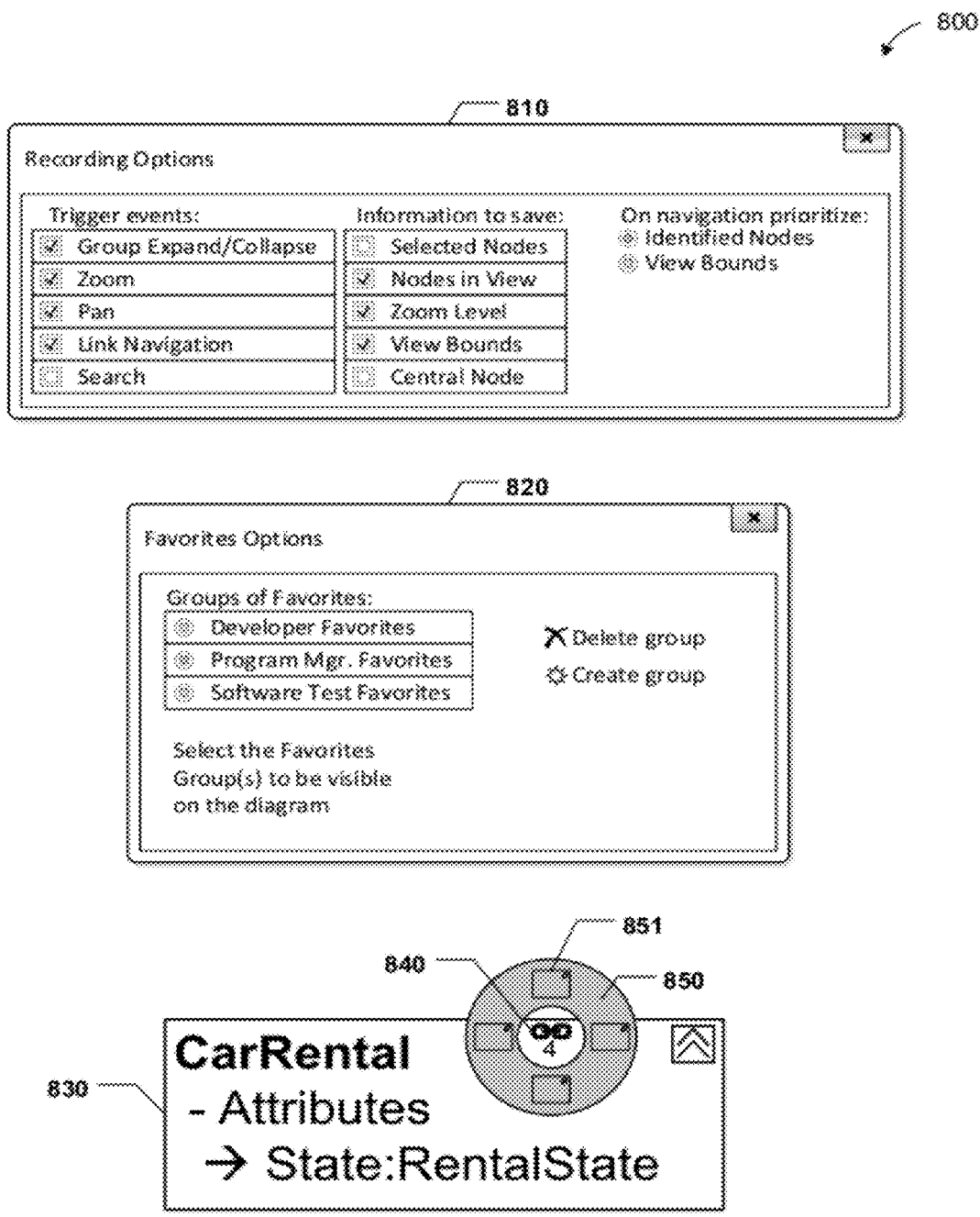
FIG. 8 is a diagram to illustrate particular embodiments of elements of the interface of FIG. 7.

FIG. 8 is a diagram to illustrate particular embodiments of various graphical elements accessible via the interface 700 of FIG. 7.

In a particular embodiment, when a user selects the options button 702 of FIG. 7, the user is presented with a recording options dialog 810. Each placemarker may have different recording options. The recording options dialog 810 may enable the user to select which trigger events (e.g., user actions) result in automatically saving a new placemarker. For example, in the embodiment illustrated in FIG. 8, expanding or collapsing a group of nodes at the interface 700 of FIG. 7, zooming in or out at the interface 700, panning (e.g., scrolling) at the interface 700, and navigating (e.g., traversing) a link at the interface 700 may trigger the storage of a new placemarker, while performing a search at the interface 700 may not. It should be noted that to prevent duplication, the action of restoring a placemarker may not automatically trigger storage of another placemarker. The newly stored placemarker may be added to the history tab 703 (though not the favorites tab 709, since the user has not marked it as a favorite).

The recording options dialog 810 may also enable the user to determine what information is saved in a placemarker. For example, in the embodiment illustrated in FIG. 8, the nodes in the view, the zoom level, and the bounds of the view may be saved in the placemarker, but a list of selected nodes and an identification of which node is closest to the center of the view may not be saved. The recording options dialog 810 may further enable the user to decide whether to prioritize the list of identified nodes or the bounds of the view to resolve conflicts when navigating to (e.g., restoring) the saved placemarker. To illustrate, a conflict may arise during restoration of a particular placemarker when the set of nodes identified by the placemarker have changed or have become arranged differently. In such situations, the conflict resolution option may prioritize either the list of identified nodes or the bounds (e.g., coordinates) of the view. If the nodes are prioritized, the bounds and the zoom level stored in the placemarker may be updated to accommodate the new node arrangement. If the bounds are prioritized, the list of nodes identified by the placemarker may be modified.

When the user selects the favorites option control 710 of FIG. 7, the user may be presented with a favorites options dialog 820. The favorites options dialog 820 may enable the user to select which groups (e.g., lists) of favorites are displayed in the favorites tab 709 of FIG. 7. For example, in the embodiment illustrated in FIG. 8, the user may choose one or more of a "Developer Favorites" group, a "Program Manager Favorites" group, and a "Software Test Favorites" group. The user may also delete groups and add groups via the favorites options dialog 820.

In a particular embodiment, each node displayed at the interface 700 is operable to restore any of the stored placemarkers that include the node. To illustrate, a "CarRental" node 830 may include a notation 840 that indicates whether the "CarRental" class is included in any placemarkers, and if so, how many. For example, in the embodiment illustrated in FIG. 8, the "CarRental" node 830 is included in four placemarkers. In a particular embodiment, the user may select the notation 840 to see and select from among the associated placemarkers. For example, the user may select (e.g., "click" or "hover" on) the notation 840 to view a circle 850 that includes thumbnails 851 for the four placemarkers (e.g., the thumbnails 705 of FIG. 7). The user may navigate to a specific placemarker by clicking on its thumbnail.

Figure 9:
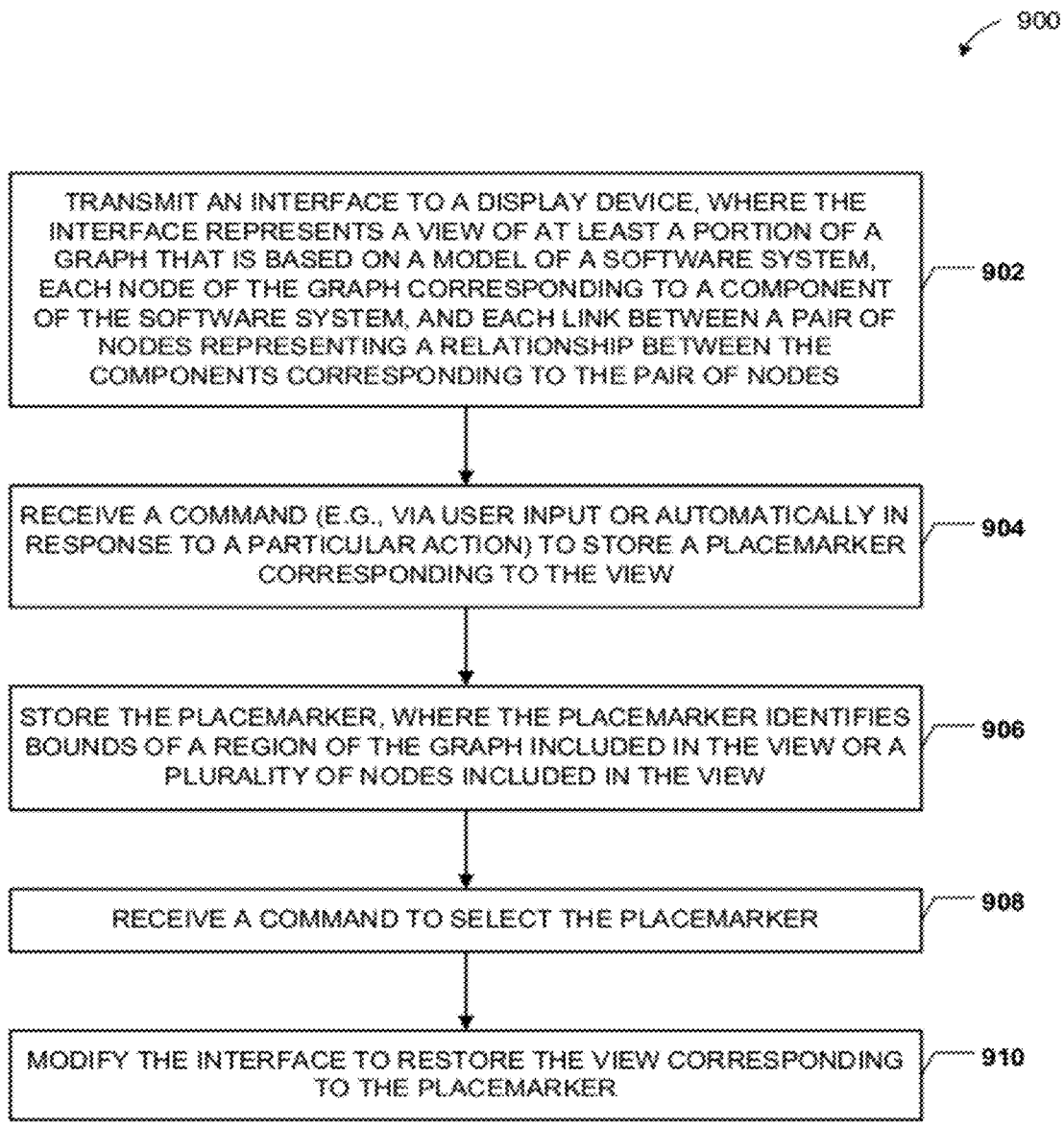
FIG. 9 is a flow diagram to illustrate a particular embodiment of a method of navigating between views of a graph using placemarkers.

FIG. 9 is a flow diagram to illustrate a particular embodiment of a method 900 of navigating between views of a graph using placemarkers. In an illustrative embodiment, the method 900 may be performed at the system 100 of FIG. 1.

The method 900 may include transmitting an interface to a display device, at 902. The interface may represent a view of at least a portion of a graph that is based on a model of a software system. Each node of the graph may correspond to a component of the software system, and each link between a pair of nodes may represent a relationship between the components corresponding to the pair of nodes. For example, in FIG. 1, the rendering module 130 may transmit the first interface 132 to the display device 160, where the first interface 132 represents a view of at least a portion of the graph 120.

The method 900 may also include receiving a command to store a placemarker corresponding to the view, at 904. The command may be received via user input or automatically in response to a particular action. For example, in FIG. 1, the graph control module 140 may receive the command 142.

The method 900 may further include storing the placemarker, at 904. The placemarker may identify bounds of a region of the graph included in the view or may identify a plurality of nodes included in the view. For example, in FIG. 1, graph control module 140 may store the placemarker 144 at the data storage device(s) 150.

The method 900 may include receiving a command to select the placemarker, at 908, and modifying the interface to restore the view corresponding to the placemarker, at 910. For example, in FIG. 1, the graph control module 140 may retrieve the placemarker 144 and provide the placemarker 144 to the rendering module 130. The rendering module 130 may restore the view by transforming the interface at the display device 160 into the second interface 134.

Figure 10:
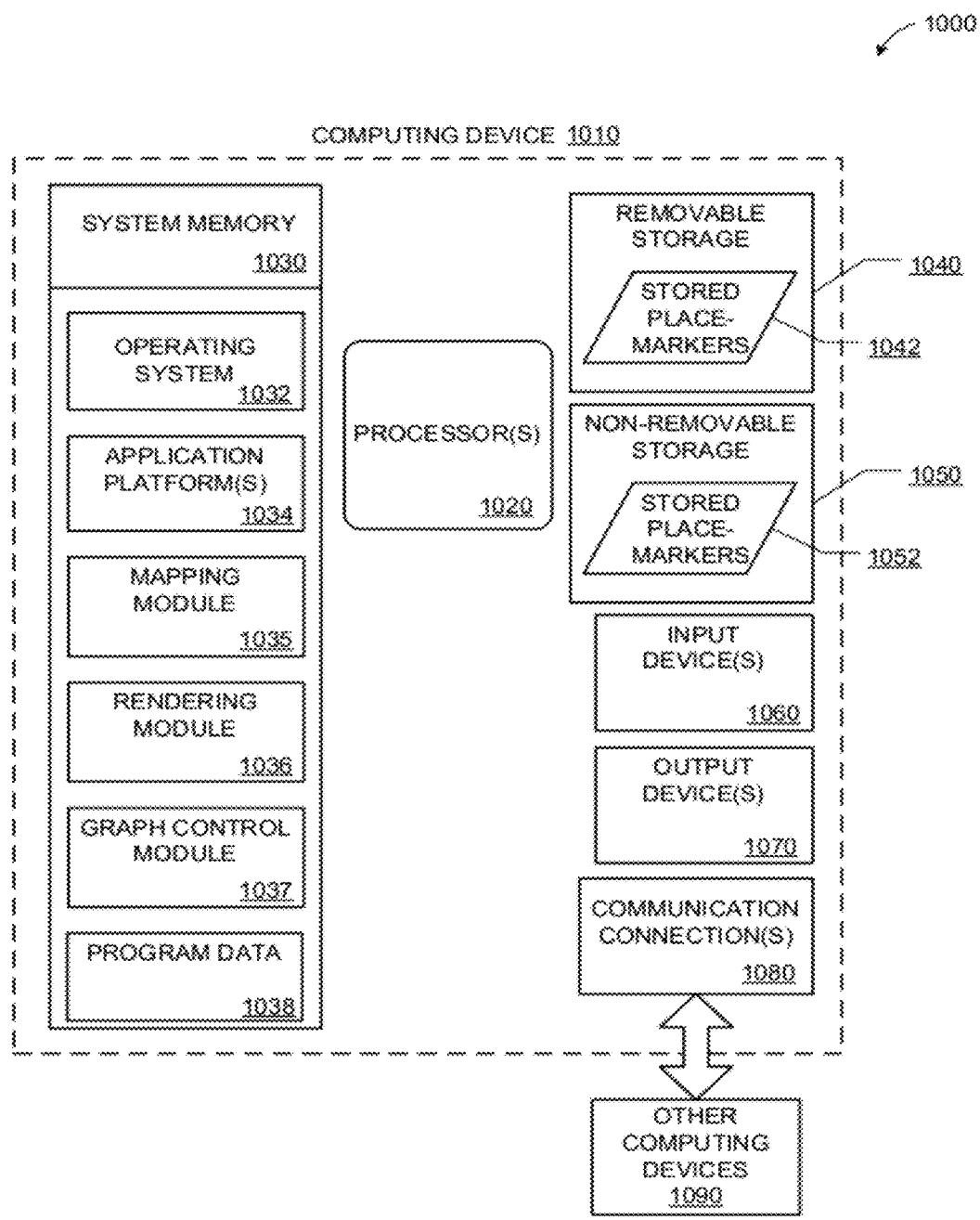
FIG. 10 is a block diagram of a computing environment including a computing device operable to support embodiments of computer-implemented methods, computer program products, and system components as illustrated in FIGS. 1-9.

FIG. 10 shows a block diagram of a computing environment 1000 including a computing device 1010 operable to support embodiments of computer-implemented methods, computer program products, and system components according to the present disclosure. For example, the computing device 1010 or components thereof may include, implement, or be included as a component of the system 100 of FIG. 1.

The computing device 1010 includes at least one processor 1020 and a system memory 1030. For example, the computing device 1010 may be a desktop computer, a laptop computer, a tablet computer, a mobile phone, a server, or any other fixed or mobile computing device. Depending on the configuration and type of computing device, the system memory 1030 may be volatile (such as random access memory or "RAM"), non-volatile (such as read-only memory or "ROM," flash memory, and similar memory devices that maintain stored data even when power is not provided), non-transitory, some combination of the three, or some other memory. The system memory 1030 may include an operating system 1032, one or more application platforms 1034, one or more applications, and program data 1038. For example, the system memory 1030 may store application components such as a mapping module 1035, a rendering module 1036, and a graph control module 1037. In an illustrative embodiment, the mapping module 1035, the rendering module 1036, and the graph control module 1037 are the mapping module 110, the rendering module 130, and the graph control module 140 of FIG. 1, respectively.

The computing device 1010 may also have additional features or functionality. For example, the computing device 1010 may also include removable and/or non-removable additional data storage devices such as magnetic disks, optical disks, tape, and standard-sized or flash memory cards. Such additional storage is illustrated in FIG. 10 by removable storage 1040 and non-removable storage 1050. The removable storage 1040 may store placemarkers 1042. The non-removable storage 1050 may also store placemarkers 1052. Computer storage media may include volatile and/or non-volatile storage and removable and/or non-removable media implemented in any technology for storage of information such as computer-readable instructions, data structures, program components or other data. The system memory 1030, the removable storage 1040, and the non-removable storage 1050 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other non-transitory medium that can be used to store information and that can be accessed by the computing device 1010. Any such computer storage media may be part of the computing device 1010.

The computing device 1010 may also have input device(s) 1060, such as a keyboard, mouse, pen, voice input device, touch input device, etc. connected via one or more input interfaces. Output device(s) 1070, such as a display, speakers, printer, etc. may also be included and connected via one or more output interfaces. For example, the output device(s) 1070 may include the display device 160 of FIG. 1.

The computing device 1010 also contains one or more communication connections 1080 that allow the computing device 1010 to communicate with other computing devices 1090 over a wired or a wireless network. For example, the one or more communication connections 1080 may represent an interface that communicates with the other computing devices 1090 via a network.

It will be appreciated that not all of the components or devices illustrated in FIG. 10 or otherwise described in the previous paragraphs are necessary to support embodiments as herein described. For example, the removable storage 1040 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of non-transitory storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method, comprising:
    transmitting an interface to a display device, wherein the interface represents a view of at least a portion of a graph that is representative of a software system, wherein the graph is created based on data that is generated by an integrated development environment used to develop the software system, wherein the graph includes a plurality of nodes connected by a plurality of links, and wherein at least one node of the graph includes another node;
    transmitting with the interface an indication of a recording options dialog, the recording options dialog enabling selection of recording options, wherein the recording options include a view bounds option and an identified nodes option;

detecting a selection of one of the recording options;

receiving a command to store a placemarker corresponding to the view, wherein the command to store the placemarker includes the selected recording option, wherein selection of the view bounds option corresponds to the placemarker display based on the bounds of a region of the graph included in the view and selection of the identified nodes option corresponds to the placemarker display based on the plurality of nodes of the graph included in the view; and storing the placemarker, wherein the placemarker is selectable to restore the view at the interface.

2. The computer-implemented method of claim 1, further comprising:

receiving a command to select the placemarker; and modifying the interface to restore the view corresponding to the placemarker.

3. The computer-implemented method of claim 1, wherein the command to store the placemarker is received automatically in response to detecting a particular action at the interface.

4. The computer-implemented method of claim 3, wherein the particular action is user selectable and comprises expanding or collapsing a node or a group of nodes, zooming in or zooming out on the graph, traversing a link of the graph, performing a search of the graph, or any combination thereof.

5. The computer-implemented method of claim 1, wherein the placemarker indicates whether each node included in the view is selected or unselected.

6. The computer-implemented method of claim 1, further comprising creating the graph based on a model of the software system.

7. The computer-implemented method of claim 1, wherein each node of the graph corresponds to a component of the software system and wherein each link between a pair of nodes of the graph represents a relationship between the components corresponding to the pair of nodes.

8. The computer-implemented method of claim 7, wherein the relationship is an inherency relationship.

9. The computer-implemented method of claim 1, wherein the data includes one or more unified modeling language (UML) files, one or more abstract syntax tress (ASTs), or one or more extensible markup language (XML) configuration files, and wherein the graph is generated from application data and source files of the software system.

10. The computer-implemented method of claim 1, wherein the graph includes class diagrams, execution sequence diagrams, use case diagrams, and activity diagrams, wherein the graph includes class links between nodes of different diagrams, and wherein a node representing a particular class appears in a class diagram and in an execution sequence diagram that includes objects of the particular class.

11. The computer-implemented method of claim 1, further comprising concurrently displaying sub-diagrams of the graph, wherein each of the sub-diagrams has a different visual setting.

12. The computer-implemented method of claim 1, further comprising setting a conflict resolution setting of the placemarker.

13. The computer-implemented method of claim 1, further comprising displaying a placemarker recording control that includes stop, record, and pause options, wherein a first placemarker corresponding to a first view has a first recording option and a second placemarker corresponding to a second view has a second recording option, and wherein the first placemarker has first trigger events selected by a user to automatically save the first placemarker.

14. The computer-implemented method of claim 1, wherein the selection of one of the recording options is an automatic selection.

15. A computer system, comprising:

a processor;

a mapping module executable by the processor to create a graph representative of a software system, wherein the graph is created based on data that is generated by an integrated development environment used to develop the software system, wherein the graph includes a plurality of nodes connected by a plurality of links, and wherein at least one node of the graph includes another node;

a rendering module executable by the processor to generate an interface that represents a view of at least a portion of the graph; and a graph control module executable by the processor to:

transmit with the interface an indication of a recording options dialog, the recording options dialog enabling selection of recording options where the recording options include an identified nodes option and a view bounds option;

detect a selection of one of the recording options;

receive a command to store a placemarker corresponding to the view, wherein the placemarker corresponds to a placemarker display that is selectably based on bounds of a region of the graph included in the view or based on a plurality of nodes of the graph included in the view, wherein the command to store the placemarker includes the selected recording option, and wherein selection of the view bounds option corresponds to the placemarker display based on the bounds of a region of the graph included in the view and selection of the identified nodes option corresponds to the placemarker display based on the plurality of nodes of the graph included in the view;

store the placemarker, wherein the placemarker is selectable to restore the view at the interface;

receive a command to select the placemarker; and transmit the placemarker to the rendering module for modification of the interface to restore the view corresponding to the placemarker.

16. The computer system of claim 15, wherein each node displayed at the interface is operable to restore any stored placemarker that includes the node.

17. The computer system of claim 16, wherein the software system includes one or more classes, one or more execution sequences, one or more use cases, one or more activities, or any combination thereof.

18. The computer system of claim 15, wherein the interface includes a thumbnail corresponding to the stored placemarker, and wherein the rendering module is further configured to modify the thumbnail responsive to detecting a modification of the graph, a modification of the stored placemarker, or any combination thereof.

* * * * *